(12) United States Patent
Dandekar et al.

(10) Patent No.: US 7,770,927 B2
(45) Date of Patent: Aug. 10, 2010

(54) ENERGY ABSORBING SYSTEM FOR A VEHICLE

(75) Inventors: Bhushan W. Dandekar, Rochester Hills, MI (US); Vikas Bhu Sharma, Bangalore (IN); Vijay Shankar Iyer, Bangalore (IN); Manoj Marella, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 211 days.

(21) Appl. No.: 12/105,689

(22) Filed: Apr. 18, 2008

(65) Prior Publication Data

US 2009/0261620 A1 Oct. 22, 2009

(51) Int. Cl.
*B62D 21/15* (2006.01)
(52) U.S. Cl. ...................... 280/784; 180/312
(58) Field of Classification Search ............ 180/232, 180/312; 280/124.109, 781, 784; 296/187.03, 296/187.09, 203.01, 203.02, 204
See application file for complete search history.

(56) References Cited

U.S. PATENT DOCUMENTS

| | | | | |
|---|---|---|---|---|
| 1,440,837 A * | 1/1923 | Murphy | ...................... | 280/781 |
| 6,047,988 A * | 4/2000 | Aloe et al. | ................... | 280/788 |
| 6,131,685 A * | 10/2000 | Sakamoto et al. | ............ | 180/232 |
| 6,398,292 B2 * | 6/2002 | Tsuruta et al. | ......... | 296/187.09 |
| 6,416,119 B1 * | 7/2002 | Gericke et al. | .............. | 296/205 |
| 2005/0077711 A1 * | 4/2005 | Yasui et al. | ................. | 280/735 |
| 2005/0212334 A1 * | 9/2005 | Murata et al. | ............... | 296/204 |
| 2006/0255625 A1 * | 11/2006 | Kitoh et al. | ................. | 296/204 |
| 2006/0284449 A1 * | 12/2006 | Miyahara | .................... | 296/204 |

\* cited by examiner

*Primary Examiner*—Paul N Dickson
*Assistant Examiner*—Joseph Rocca
(74) *Attorney, Agent, or Firm*—Quinn Law Group, PLLC

(57) ABSTRACT

A system for absorbing energy in a vehicle includes a pair of laterally spaced upper and lower side rails which extend along a longitudinal axis. The lower side rails are disposed below the upper side rails. An upper member extends transverse to the longitudinal axis and interconnects the upper side rails. A lower member extends transverse to the longitudinal axis and interconnects the lower side rails. The upper and lower members are each disposed to transmit energy from the upper and lower members through the respective upper and lower side rails. The upper and lower members are configured to simultaneously deform upon impact of the vehicle with an object and transfer a force generated from impacting the object to the upper and lower side rails, respectively.

14 Claims, 4 Drawing Sheets

US 7,770,927 B2

ENERGY ABSORBING SYSTEM FOR A VEHICLE

TECHNICAL FIELD

The present invention relates to a system for absorbing energy during impact of a vehicle.

BACKGROUND OF THE INVENTION

A vehicle typically has a pair of laterally spaced frame rails and a bumper beam which extends transverse to and interconnects the frame rails. An energy absorber is operatively attached to the bumper beam. A force is generated upon impact between the energy absorber of the vehicle and an object, which is transferred from the energy absorber to the bumper beam to the frame rails. A portion of the energy from the impact is absorbed by deformation of the energy absorber, the bumper beam, and the upper side rails.

SUMMARY OF THE INVENTION

An energy absorbing system for a vehicle is provided. The system includes a cradle for supporting an engine of the vehicle. A lower member extends from the cradle. The lower member is configured to dissipate energy and deform upon impact of the vehicle with an object. The lower member and the cradle define a compaction zone therebetween for receiving a portion of the lower member when the lower member deforms.

An energy absorbing system for a vehicle is provided. The system includes a pair of laterally spaced upper side rails extending along a longitudinal axis. A pair of laterally spaced lower side rails extend along the longitudinal axis. The lower side rails are disposed below the upper side rails. An upper member extends transverse to the longitudinal axis and interconnects the upper side rails. A lower member extends transverse to the longitudinal axis and is disposed to transmit energy from the lower member through the lower side rails. The upper member and the lower member are configured to deform upon impact of the vehicle with an object.

An energy absorbing system for a vehicle is provided. The system includes a pair of laterally spaced upper side rails extending along a longitudinal axis. An upper member extends generally transverse to the longitudinal axis and interconnects the upper side rails and is disposed to transmit energy through the upper side rails. A pair of laterally spaced lower side rails extends along the longitudinal axis. The lower side rails are disposed below the upper side rails. A front cross-member extends transverse to the longitudinal axis and interconnects the lower side rails. A junction is defined between each of the lower side rails and the front cross-member. A lower member extends generally transverse to the longitudinal axis and is operatively connected to the junctions to transmit energy through the lower side rails. The upper member and the lower member are configured to deform upon impact of the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
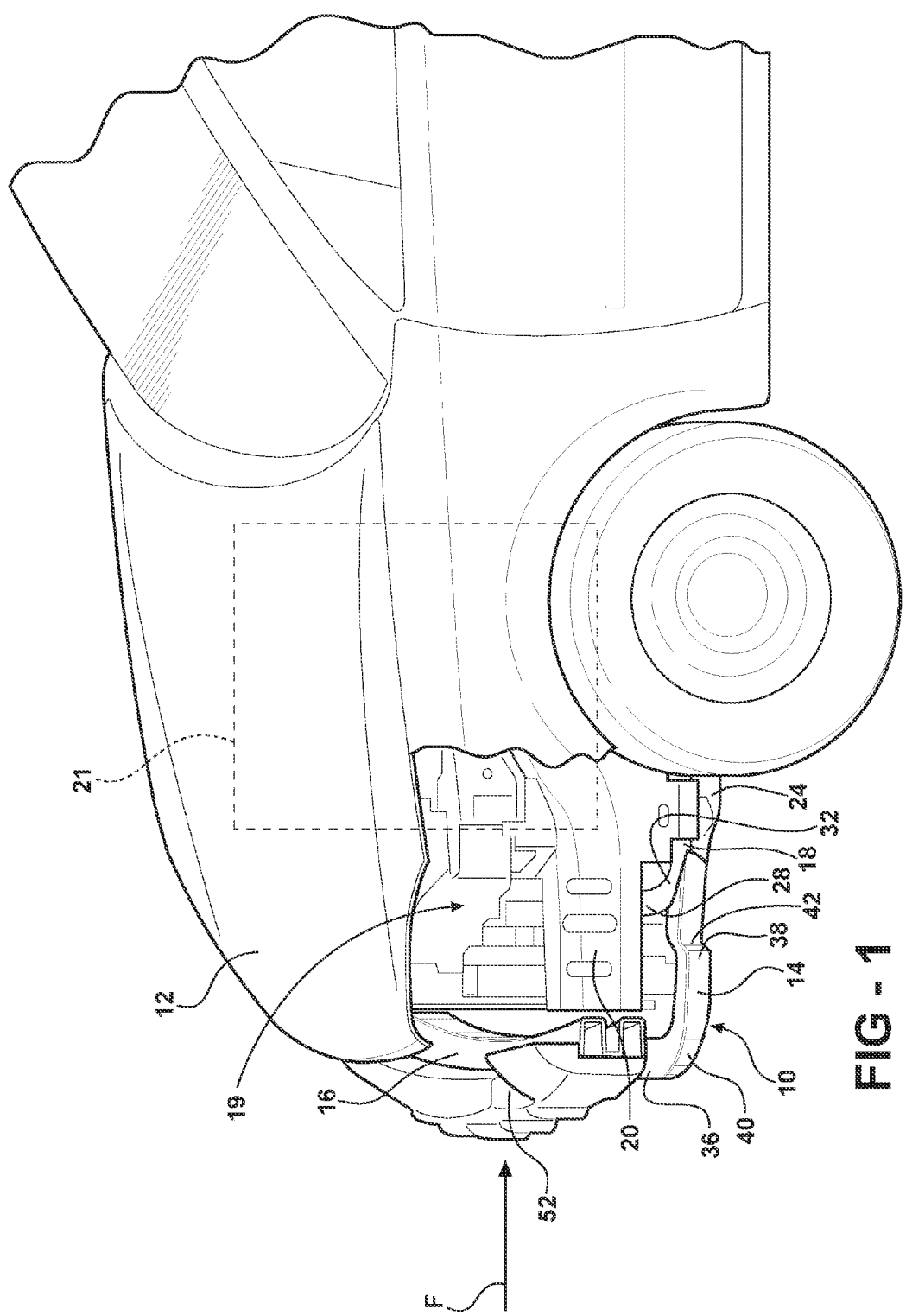
FIG. 1 is a partial cross-sectional perspective view of a front portion of a vehicle and an object external to the vehicle.

Referring to the drawings, wherein like reference numbers refer to like components, FIG. 1 shows an energy absorbing system 10 for a vehicle 12. The system 10, which is disposed in a front portion of the vehicle 12, includes a lower member 14 and an upper member 16. Each member 14, 16 is for dissipating and absorbing energy which is generated upon impact of the vehicle 12 with an object. The lower member 14 is connected to a cradle 18, mounted within an engine compartment 19 of the vehicle 12. The cradle 18 is for supporting an engine 21 of the vehicle 12. The upper member 16, or front bumper beam, is connected to a pair of laterally spaced upper side rails 20 which extend along a longitudinal axis 22 and above the cradle 18.

Figure 2:
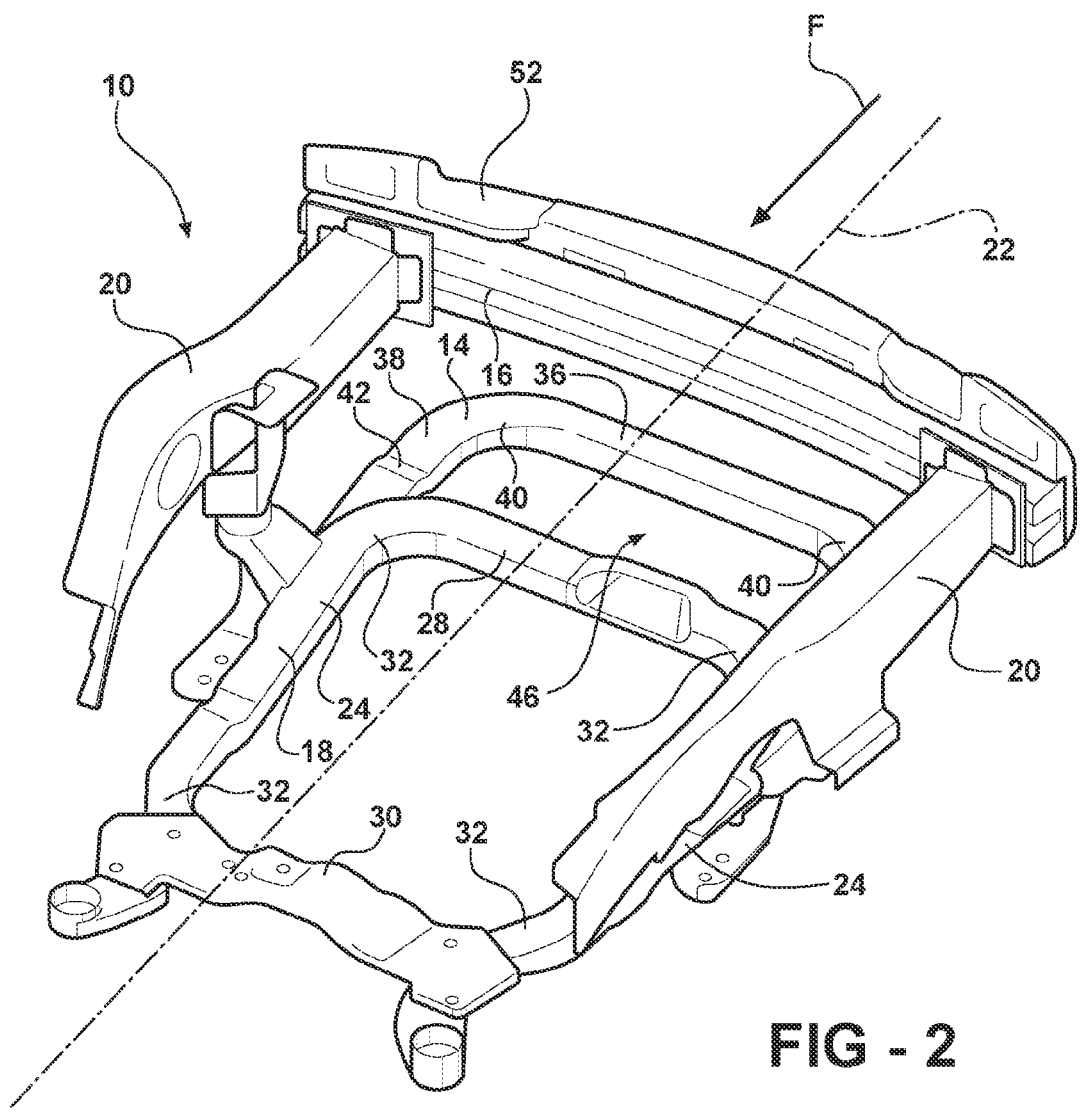
FIG. 2 is a perspective view of an energy absorbing system of the vehicle and the object.

Referring generally to FIG. 2, the cradle 18 has a generally rectangular profile and is formed from hollow tubing. However, a cradle 18 having a profile of a different shape may also be used. The cradle 18 includes a pair of lower side rails 24 that are laterally spaced. The lower side rails 24 are disposed below the upper side rails 20 and extend along the longitudinal axis 22 of the vehicle. A pair of laterally spaced cross-members 28, 30 extend in generally parallel relationship to one another. The cross-members 28, 30 include a front cross-member 28 and a rear cross-member 30, which are disposed transverse to the lower side rails 24 and interconnect the lower side rails 24 to form the rectangular profile of the cradle 18. Junctions 32 (i.e., corners) are defined between each of the cross-members 28, 30 and each of the lower side rails 24. The lower member 14 is attached to a corresponding lower side rail 24 at the junctions 32 of the front cross-member 28. The junctions 32 are generally curved, presenting an arcuate shape. The arcuate shape of the junctions 32 provides a smooth transition between each cross-member 28, 30 and the associated lower side rail 24. It should be appreciated that junctions 32 having different shapes (e.g., right angles, etc.) may also be used as known to those skilled in the art.

Figure 3:
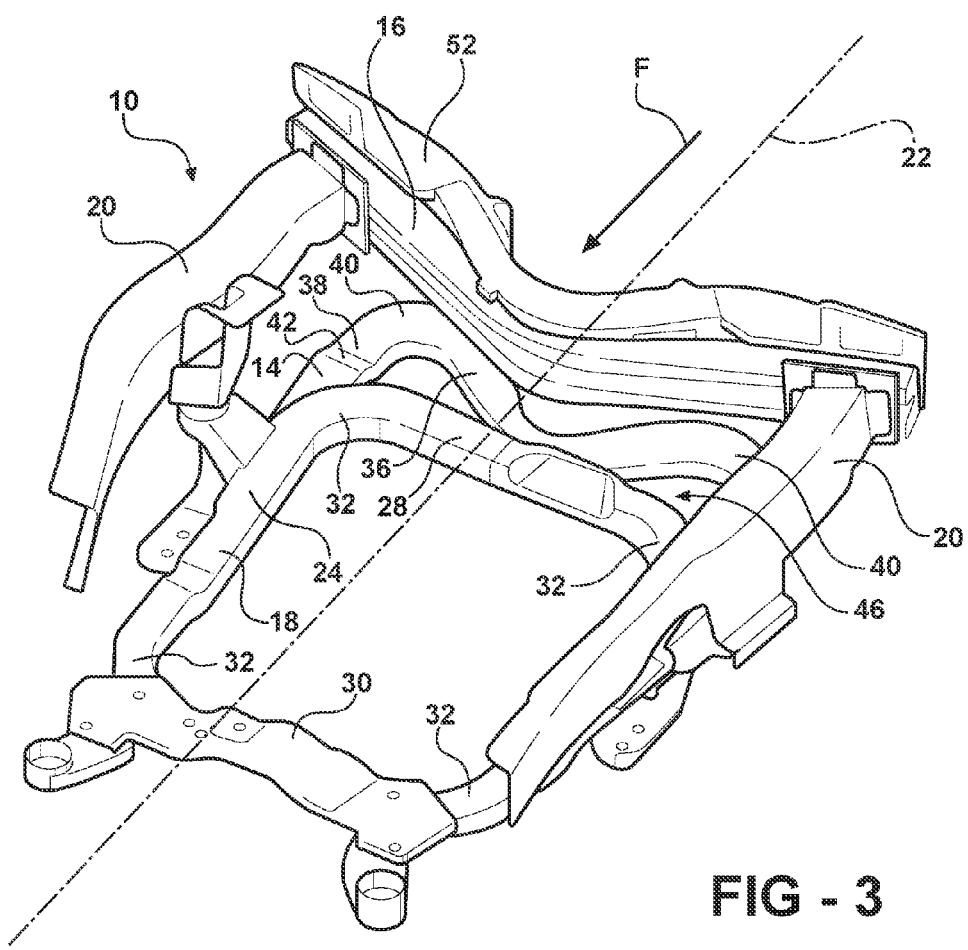
FIG. 3 is a perspective view of the energy absorbing system of the vehicle of FIG. 2 illustrating the energy absorbing system impacting the object.

The lower and upper members 14, 16 are positioned to receive an impact force F when an object strikes the front of the vehicle 12. Referring to FIG. 3, the lower member 14 is configured to deform when the lower member 14 is subjected to the force F. The lower member 14 is formed from aluminum, steel, or any other suitable material known to those skilled in the art. The lower member 14 has a generally hollow and closed cross-section, which is formed by hydro-forming or any other suitable method known to those skilled in the art. The shape of the cross-section is circular, oblong, rectangular, or any other suitable shaped cross-section known to those skilled in the art. The cross-section may include multiple cells (e.g., two box sections). However, the cross-section may have only one cell as multiple cells are not required. Additionally, it should be appreciated that the cross-section of the lower member 14 is not limited to being hollow and is any desired cross-section suitable for energy absorption. In addition to deforming, the lower member 14 is attached to the cradle 18 such that the impact of the lower member 14 with the object distributes the force F from the impact with the object to each of the lower side rails 24.

Figure 4:
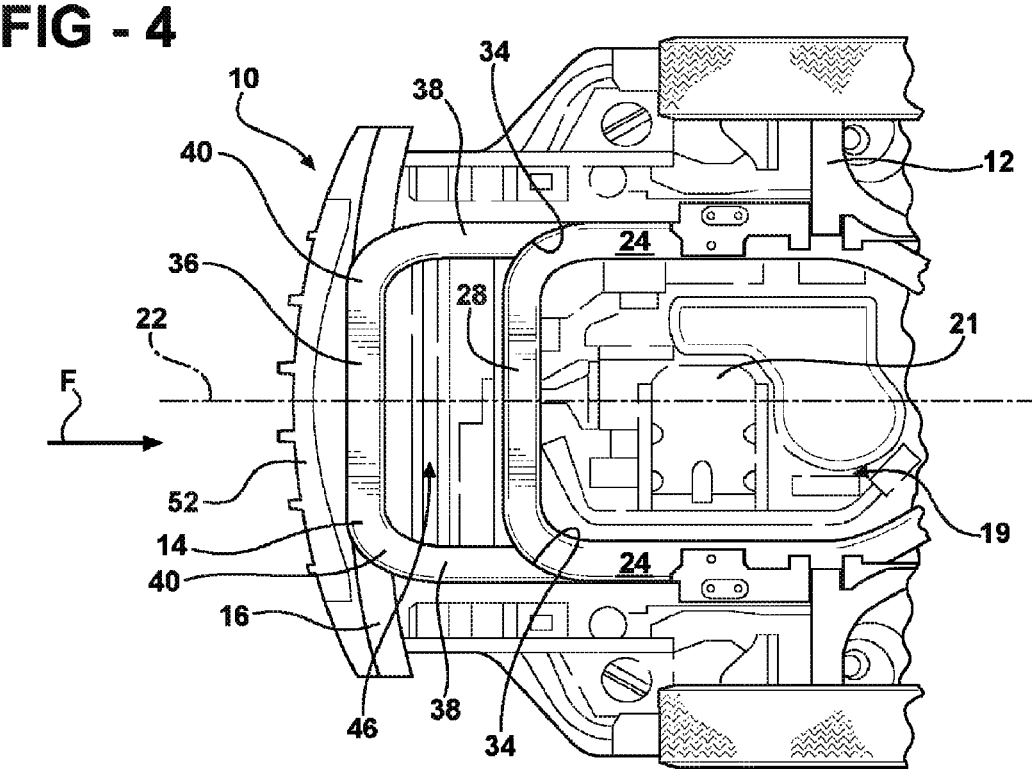
FIG. 4 is a bottom view of the energy absorbing system.

Referring to FIGS. 2-4, the lower member 14 extends transverse to the longitudinal axis 22 and is attached to the cradle 18. The lower member 14 presents a C-shaped profile that extends between opposing ends 34, as shown in FIG. 4. The lower member 14 is long enough such that the ends 34 are attached to the cradle 18 at the lower side rails 24. Therefore, the lower member 14 extends across the entire front cross-member 28 of the lower cradle 18. In an exemplary embodiment of the present invention, the lower member 14 includes a front portion 36 and a pair of laterally spaced side portions 38 that extend from the front portion 36 to the respective ends 34. A bend 40 (i.e., a corner) is defined between the front portion 36 and each of the side portions 38. The bend 40 operates to space the front portion 36 of the lower member 14, along the longitudinal axis 22, from the front cross-member 28, via the side portions 38. The distance the front portion 36 extends from the front cross-member 28 is dictated by the length of the side portions 38. The bends 40 are shaped into any desired angle and provide a transition from the front portion 36, which extends generally parallel to the front cross-member 28, to the respective side portion, which extends generally parallel to the lower side rails 24. In the exemplary embodiment, the bend 40 is a curved corner, such as an arc. The bend 40 allows the side portions 38 to be perpendicular to the front portion 36 and generally parallel to each of the lower side portions 38, as shown in FIG. 4. In an alternative embodiment, the bend 40 is a right angle, such that the side portions 38 are perpendicular to the front portion 36 and generally parallel to each of the lower side portions 38. In this embodiment, the side portions 38 are attached to the front portion 36 at the bend 40 by welding, fasteners, brackets, or any other form of attachment known to those skilled in the art. In yet another alternative embodiment, the entire lower member 14 presents an arc-shaped profile that extends between the ends. In this embodiment, the lower member 14 extends as a single component between the ends. Therefore, the lower member 14 extends as a single, seamless, continuous lower member 14 with no differentiation between the front portion 36, the bends 40, and the lower side portions 38.

As described previously, the side portions 38 provide spacing between the front portion 36 and the front cross-member 28 of the cradle 18, as shown in FIGS. 2-4. A compaction zone 46 is defined between the lower member 14, each of the side portions 38, and the front cross-member 28 of the cradle 18. The compaction zone 46 is an opening that receives a portion of the lower member 14 when the lower member 14 deforms due to the force F generated upon impact of the vehicle 12 with the object, as shown in FIG. 3.

Referring to FIG. 4, the lower member 14 includes a curvature 42 that is formed along each of the lower side portions 38. The curvature 42 is for orienting the front portion 36 relative to the ground, the upper member 16, a radiator, etc. For example, the curvature 42 is for spacing the lower member 14 a desired vertical distance D from the upper member 16. As another example, the lower member 14 provides a mounting surface for attachment of the radiator. Therefore, the curvature 42 orients the lower member 14 to correspond to the radiator.

Each end 34 of the lower member 14 has a generally concave shape. The concave shape presented by each of the ends 34 is complimentary to the arcuate shape of the associated junction 32 of the cradle 18. This means that the ends 34 of the lower member 14 are shaped to conform to the arcuate shape of the corresponding junction 32 for attachment of the lower member 14 to the cradle 18. The lower member 14 is attached to the junctions 32 of the cradle 18 by welding, fasteners, brackets, or any other form of attachment known to those skilled in the art. Attachment of the lower member 14 to the junction 32 provides an additional load path to each of the lower side rails 24 from the lower member 14 for transferring the force F that is generated upon impact with the object. It should be appreciated that other configurations for attaching the ends 34 of the lower member 14 to the cradle 18 may also be used so long as the lower member 14 absorbs and transfers energy to the lower side rails 24.

Referring to FIGS. 2 and 3, the upper member 16 extends transverse to the longitudinal axis 22 and interconnects the upper side rails 20. The upper member 16 is disposed above and spaced from the lower member 14 in generally parallel relationship. The upper member 16 is formed with a cross-section having a thin walled structure, i.e., a hollow interior. However, it should be appreciated that the cross-section of the upper member 16 is not required to be hollow or thin walled as the upper member 16 may be formed having any desired cross-section known to those skilled in the art.

Figure 5:
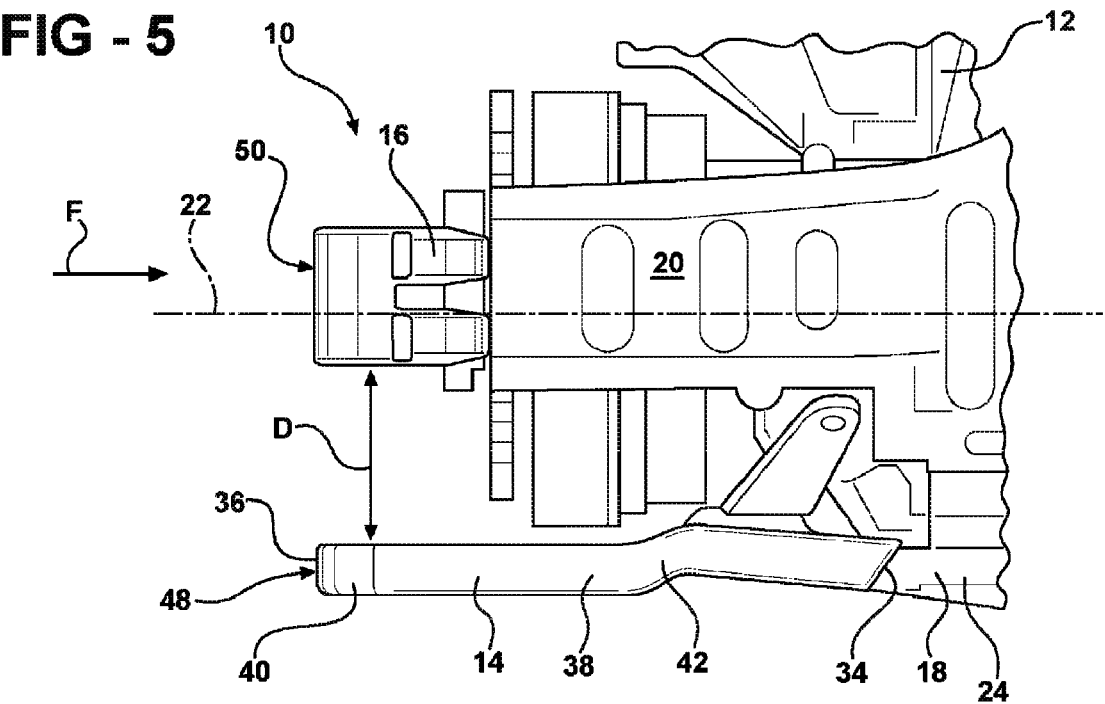
FIG. 5 is a side view of the energy absorbing system.

Referring to FIG. 5, the lower member 14 presents a lower front face 48 and the upper member 16 presents an upper front face 50. The faces are generally coplanar at or near a front of the vehicle 12. This means that the faces are aligned at the front of the vehicle 12, allowing the lower member 14 and the upper member 16 to simultaneously impact the object. This simultaneous impact allows for early engagement of the front cradle 18 during impact with the object, allowing increased dispersion of energy absorption and transmission of the force F through both the upper and lower side rails 20, 24. This means that the upper member 16 and the lower member 14 are configured such that they simultaneously deform upon impact of the vehicle 12 with the object to absorb energy generated by the force F and transmit energy through the lower and upper side rails 24, 20, respectively. By spreading the force F of the impact of the vehicle with the object between both the lower and upper members 14, 16 and the corresponding side rails 24, 20, deformation to the remainder of the vehicle 12 is reduced.

Referring to FIGS. 1-4, to provide additional absorption and dispersion of energy to the vehicle 12, an energy absorber 52, or front bumper energy absorber, is disposed on the upper front face 50 of the upper member 16. As best seen in FIG. 4, the energy absorber 52 impacts the object prior to the members 14, 16 impacting the object. Therefore, the energy absorber 52 is disposed further toward the front of the vehicle than the lower and upper members 14, 16. Upon impact of the vehicle 12 with the object, the energy absorber 52 also deforms and transmits the force F associated with the impact with the upper member 16. The energy absorber 52 is typically formed from a foam material. However, any other suitable material known to those skilled in the art may also be used.

While the best modes for carrying out the invention have been described in detail, those familiar with the art to which this invention relates will recognize various alternative designs and embodiments for practicing the invention within the scope of the appended claims.

The invention claimed is:

1. An energy absorbing system for a vehicle, said system comprising:
a cradle for supporting an engine of the vehicle; wherein said cradle includes a pair of lower side rails extending in spaced relationship and a front cross-member presenting a C-shaped profile, when viewed from a bottom view, and extending transverse to and interconnecting said pair of lower side rails;

junctions defined between said front cross-member and each of said lower side rails;

a lower member presenting a C-shaped profile, when viewed from a bottom view, corresponding to the C-shaped profile of the front cross-member extending between a pair of ends;

wherein each of said pair of ends of the lower member have arcuate shaped ends that are attached to said cradle at a respective one of said junctions by an arcuate joint, such that said lower member extends from said cradle, the arcuate ends corresponding to the C-shaped profile of the front cross-member, when viewed from a bottom view, and arranged such that the respective outer ends of the lower member lie in the same longitudinal and horizontal plane as that of the lower side rails;

wherein said lower member is configured to dissipate energy and deform upon impact of the vehicle with said lower member;

wherein said lower member is configured to dissipate energy by distributing a force from the impact of the vehicle with said lower member through each of said ends to each of said lower side rails; and wherein said lower member and said cradle define a compaction zone therebetween for receiving a portion of said lower member upon deformation of said lower member.

2. A system, as set forth in claim 1, further comprising an upper member disposed above said lower member in spaced and parallel relationship.

3. A system, as set forth in claim 2, wherein said lower member presents a lower front face and said upper member presents an upper front face with said lower front face and said upper front face being generally coplanar for allowing said lower member and said upper member to simultaneously dissipate energy and deform upon impact of the vehicle.

4. A system, as set forth in claim 2, further comprising an energy absorber disposed on said upper member for dissipating energy and deforming upon impact of the vehicle prior to said upper member and said lower member dissipating energy and deforming.

5. A system, as set forth in claim 2, wherein said lower member includes:

a front portion extending in spaced relationship to said front cross-member; and a pair of laterally spaced side portions extending from said front portion to said ends;

wherein each of said side portions includes a curvature to space said front portion a vertical distance from said upper member.

6. A system, as set forth in claim 1, further comprising a rear cross-member in spaced and generally parallel relationship to said front cross-member with said front cross-member extending transverse to and interconnecting said pair of lower side rails.

7. A system, as set forth in claim 1, wherein said junctions have an arcuate shape.

8. A system, as set forth in claim 1, wherein said lower member has a front portion extending in spaced relationship to said front cross-member and a pair of laterally spaced side portions extending from said front portion to said ends.

9. A system, as set forth in claim 8, wherein said lower member includes a bend defined between said front portion and each of said side portions.

10. A system, as set forth in claim 1, wherein said lower member is welded to said cradle.

11. An energy absorbing system for a vehicle, said system comprising:

a pair of laterally spaced upper side rails extending along a longitudinal axis;

a pair of laterally spaced lower side rails extending along said longitudinal axis;

said lower side rails disposed below said upper side rails;

an upper member extending generally transverse to said longitudinal axis and interconnecting said upper side rails and disposed to transmit energy through said upper side rails; and a front cross-member presenting a C-shaped profile, when viewed from a bottom view, and extending transverse to said longitudinal axis and interconnecting said lower side rails;

a lower member extending generally transverse to said longitudinal axis and disposed to transmit energy through said lower side rails;

wherein said lower member presents a C-shaped profile, corresponding to the C-shaped profile of the front cross-member, when viewed from a bottom view, and includes a front portion and a pair of laterally spaced side portions that extend in generally perpendicular relationship to said front portion to a respective end;

wherein said front portion is disposed in a spaced and generally parallel relationship to said front cross-member and defines a compaction zone therebetween;

wherein said respective ends of said side portions have an arcuate shape and are attached to respective ones of said lower side rails at an arcuate joint;

the arcuate joint corresponding to the C-shaped profile of the front cross-member, when viewed from a bottom view, and arranged such that the respective outer ends of the lower member at the joint lie in the same longitudinal and horizontal plane as that of the lower side rails;

wherein said upper member is and said lower member are configured to deform upon impact of the vehicle;

wherein said lower member is configured to deform upon impact of the vehicle such that said compaction zone receives a portion of said lower member and distributes a force through each of said side portions to said respective lower side rails.

12. A system, as set forth in claim 11, wherein said upper member and said lower member are substantially aligned such that said upper and lower members simultaneously deform upon impact of the vehicle.

13. A system, as set forth in claim 11, wherein said upper member and said lower member are substantially aligned proximate a front of the vehicle.

14. An energy absorbing system for a vehicle, said system comprising:

a pair of laterally spaced upper side rails extending along a longitudinal axis;

an upper member extending generally transverse to said longitudinal axis and interconnecting said upper side rails and disposed to transmit energy through said upper side rails;

a pair of laterally spaced lower side rails extending along said longitudinal axis; said lower side rails disposed below said upper side rails;

a front cross-member presenting a C-shaped profile, when viewed from a bottom view, and extending transverse to said longitudinal axis and interconnecting said lower side rails;

a junction defined between each of said lower side rails and said front cross-member; and a lower member extending generally transverse to said longitudinal axis;

wherein said lower member presents a C-shaped profile, corresponding to the C-shaped profile of the front cross-member, when viewed from a bottom view, and includes a front portion and a pair of laterally spaced side portions that extend in a generally perpendicular relationship to said front portion to a respective end;

wherein said respective ends of the lower member are arcuately shaped and operatively connected to said junctions, at arcuate joints, and configured to transmit energy through said side portions to each of said lower side rails upon impact of the vehicle;

said arcuate joints corresponding to the C-shaped profile of the front cross-member, when viewed from a bottom view, and arranged such that the respective outer ends of the lower member lie in the same longitudinal and horizontal plane as that of the lower side rails;

wherein said upper member is configured to deform upon impact of the vehicle.

\* \* \* \* \*